United States Patent [19]
Plancher et al.

[11] 4,325,738
[45] Apr. 20, 1982

[54] TERTIARY NITROGEN HETEROCYCLIC MATERIAL TO REDUCE MOISTURE-INDUCED DAMAGE IN ASPHALT-AGGREGATE MIXTURES

[75] Inventors: Henry Plancher; Joseph C. Petersen, both of Laramie, Wyo.

[73] Assignee: The United States of America as represented by the United States Department of Energy, Washington, D.C.

[21] Appl. No.: 225,219

[22] Filed: Jan. 15, 1981

[51] Int. Cl.³ .............................................. C09D 3/24
[52] U.S. Cl. ................................. 106/273 N; 208/44
[58] Field of Search ..................... 106/273 N; 208/44

[56] References Cited

U.S. PATENT DOCUMENTS 2,950,211  8/1960  Huber et al. .................... 106/273

Primary Examiner—John Kight, III
Assistant Examiner—Amelia B. Yarbrough
Attorney, Agent, or Firm—Harold M. Dixon; Roger S. Gaither; Richard G. Besha

[57] ABSTRACT

Asphalt-aggregate roads crack when subjected to freezing and thawing cycles. Herein, the useful life of asphalts are substantially improved by a minor amount of a moisture damage inhibiting agent selected from compounds having a pyridine moiety, including acid salts of such compounds. A shale oil fraction may serve as the source of the improving agent and may simply be blended with conventional petroleum asphalts.

15 Claims, No Drawings

TERTIARY NITROGEN HETEROCYCLIC MATERIAL TO REDUCE MOISTURE-INDUCED DAMAGE IN ASPHALT-AGGREGATE MIXTURES

BACKGROUND OF THE INVENTION

1. Technical Field

This invention relates generally to an improved bituminous binder composition useful with mineral aggregates to form roads and pavements, to serve as roofing materials, as pond lining materials and other uses where contact with moisture occurs. More particularly, the invention relates to a mixture of such a composition with mineral aggregates having improved resistance to damage from moisture and freeze-thaw cycling. The invention also relates to methods of providing areas surfaced with mixtures of such bituminous binder compositions and aggregate particles with improved weathering characteristics.

2. Background Art

Water or moisture often promote deterioration of asphaltic pavements by weakening the adhesive bond at the asphalt-aggregate interface. This deterioration is intensified by freeze-thaw cycling. Moisture damaged roads have low tensile strength and are easily cracked by the action of traffic. Roads that are located in areas where the temperature falls below the freezing point of water are prone to be severely damaged and cracked as the water or moisture present in any small cracks in the pavement composition freezes. Such damage tends to develop at the mineral aggregate-bituminous binder material boundary due to lack of adequate bonding or adhesion between the mineral aggregate and the bituminous material. Hence, asphalt pavements are particularly susceptible to damage during freeze-thaw cycling.

There are a number of known additives, or bond-improving agents, which are conventionally incorporated in bituminous compositions (asphalts) to improve adherence to aggregate surfaces. For example, secondary, tertiary and quaternary straight chain aliphatic amines serve as bond-improving agents. Such additives also include, for example, fatty acid amides of primary polyamines and their salts. Certain particularly useful fatty acid amides are set out in U.S. Pat. No. 2,950,211. Such amides include a fatty acid having a hydrocarbon chain with at least one substituent group that is connected to the hydrocarbon chain through a nitrogen atom.

While the compositions of the prior art are often effective in improving the bond between the bituminous binder composition and mineral aggregate particles, especially when the mineral aggregate particles are wet, they provide, at best, only a partial solution to the problems associated with moisture induced damage.

The present invention is directed to overcoming the problems as set forth above.

It is among the objects of this invention to provide additives or compositions for enhancing the weatherability of asphaltic-aggregate compositions.

It is another object of this invention to enhance the water damage resistance of asphaltic-aggregate compositions used as roads and other pavements, roofing materials, and pond lining materials.

Still another and more specific object of this invention is the improvement in resistance to damage from moisture and freeze-thaw conditions of asphaltic-aggregate compositions.

It is yet another object to provide a use for certain shale oil fractions having little or no uses.

Still a further object of this invention is to provide an economically feasible additive for enhancing the weatherability and general water damage resistance of asphaltic-aggregate composites.

Yet another object is to provide for an economic and environmentally acceptable method of disposing of portions of shale oil fractions.

Another object of this invention is to provide a method of enhancing weathering characteristics of asphaltic-aggregate compositions against moisture and particularly against freeze-thaw damage.

These and other objects will become apparent from the discussion found hereinafter.

SUMMARY OF THE INVENTION

In accordance with the present invention, an improved bituminous binder composition is provided. The composition includes a bituminous material along with a minor amount of a moisture damage inhibiting agent selected from compounds having the formula:

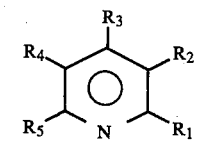

wherein $R_1$, $R_2$, $R_3$, $R_4$ and $R_5$ groups are hydrogen, organic radicals or organic radicals having chemicals constituents substituted thereon and wherein any two or more of said $R_1$, $R_2$, $R_3$, $R_4$ and $R_5$ groups may be chemically bonded one to another, and acid salts of said compounds. Preferably, the molecular weight, particularly of mixtures, is less than about 1000; more preferred are those of molecular weight about 700 or less, and most preferred are those of molecular weight about 400 or less.

In accordance with another embodiment of the present invention, a method is set out for providing a bituminous binder composition-aggregate mixture surfaced area that is resistant to moisture induced damage. The method comprises incorporating sufficient quantity of a moisture damage inhibiting agent, as set out above, in said mixture to significantly reduce moisture induced damage thereto and applying the mixture to a surface to form the surface area.

Operation in accordance with the present invention provides asphalt pavements having very markedly improved resistance to moisture induced damage as will be shown in following. Thus, upkeep of roads utilizing such asphalt paving material is greatly reduced as compared to prior art asphalt composition pavements. Quite importantly, the useful life of the asphalt-aggregate composite surface is increased severalfold.

DETAILED DESCRIPTION OF THE INVENTION

It has been discovered that highly improved resistance to moisture induced damage results when a bituminous binder composition includes a minor amount of a particular moisture damage inhibiting agent in addition to the conventional bituminous material. The moisture damage inhibiting agent of the present invention is selected from compounds having the formula:

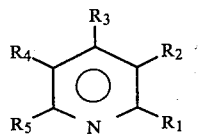

wherein $R_1$, $R_2$, $R_3$, $R_4$ and $R_5$ groups are hydrogen, organic radicals or organic radicals having chemical constituents substituted thereon and wherein any two or more of the $R_1$, $R_2$, $R_3$, $R_4$ and $R_5$ groups may be chemically bonded one to another. Acid salts (of mineral acids) of such compounds are likewise useful as moisture damage inhibiting agents. Essentially then, what is necessary is a moiety having the pyridine ring structure, i.e., a moiety which includes a six membered ring having five carbon atoms and a nitrogen atom in the ring, which ring is aromatic. Pyridine itself is one such useful moisture damage inhibiting agent. Various pyridine derivatives, including fused ring structures attached to the pyridine, are likewise useful agents. For example, quinoline and its derivatives are useful agents. It should be pointed out that the specific nature of the various groups attached to the pyridine moiety are of relatively low importance, although, of course, it is possible to find groups which will deleteriously affect the operation of the damage inhibiting agent of the invention. Generally, however, any of a number of chemical constituents can be substituted on the pyridine moiety, or on various portions of the groups $R_1$, $R_2$, $R_3$, $R_4$ and $R_5$, without departing from the scope or spirit of the present invention.

The organic radicals represented by Rs can be aliphatic or aromatic. By aliphatic is meant cyclic and acyclic structures, saturated and unsaturated such as alkyls, alkylenes, and alkynyls. For compounds having a molecular weight of up to about 200 to 300 the Rs are preferably lower alkyls such as methyl and ethyl, however quinoline is a preferred compound. The Rs can further be aryls, alkaryls and aralkyls. Preferably, the resultant pyridine compound has a molecular weight as set forth hereinabove (i.e., about 700), but higher molecular weight pyridine moiety containing compounds are also useful in the practice of the invention.

While pure compounds can be utilized as moisture damage inhibiting agents of the invention, it is in no way necessary that the agent utilized be a pure compound. In fact, it has been found that shale oil is particularly high in pyridine moiety containing compounds which will adequately serve as moisture damage inhibiting agents of the present invention. Thus, for example, an asphalt made from shale oil, i.e., a shale oil bottoms fraction, has highly improved bonding characteristics over a petroleum asphalt composition. And, blends of shale oil asphalt compositions with petroleum asphalt compositions, likewise, have far improved bonding stability over petroleum asphalts.

It has also been found that various fractions may be removed from shale oil, as by distillation, acid extraction, or other procedures, which fractions have a relatively high nitrogen content, and, more importantly, have a relatively high amount of pyridine moieties in them. Such fractions, or more specifically the pyridine moieties in such fractions, constitute excellent moisture damage inhibiting agents in accordance with the present invention. Thus, such fractions can be blended, for example, with petroleum asphalt compositions, thereby improving the overall resistance to moisture induced damage of such asphalt compositions.

It is also possible to simply apply the moisture damage inhibiting agent to mineral aggregate particles prior to their being admixed with conventional bituminous binder compositions, such as petroleum asphalt binder compositions. The amount of the moisture damage inhibiting agent utilized in such cases can be quite small, generally merely enough to very lightly wet the surfaces of the mineral aggregate particles.

When the moisture damage inhibiting agent is intermixed with the bituminous binder composition, it must generally be present in slightly greater amounts. However, it is never necessary to have a great deal of the moisture damage inhibiting agent present. Generally, the amount of the pyridine moiety containing compound present, will fall in the range from about 1 wt.% to about 15 wt.%, more preferably about 1 wt.% to about 10 wt.%, of the bituminous binder composition and the bituminous binder composition will fall within the range from about 4 wt.% to about 7 wt.% of the bituminous binder composition-aggregate mixture. However, it should be realized that even smaller amounts of the moisture damage inhibiting agent may be utilized, although the beneficial effects will then be somewhat less. And, larger amounts of the agent can be utilized, although no appreciable improvement in moisture damage resistance will result from the use of greater quantities of such stability improving agent. The amount of pyridine moiety containing compound to be employed for best results is sufficient to coat the surface area of the aggregate. Since some aggregates have a much larger surface area, in some cases more than 10 wt.% will be found desirable, but normally not more than about 15 wt.%.

The invention is applicable with all aggregates. It may be somewhat more effective with some aggregates than with others. It has been found, in particular, that even smooth stone aggregate particles, from a river bed, can be very adequately bonded to a bituminous binder composition when a pyridine moiety containing compound is present. Such smooth stones are otherwise not acceptably bondable to bituminous binders.

It is believed that the invention will be more fully understood by reference to the following specific examples which illustrate improved resistance to moisture induced damage attainable with compositions in accordance with the present invention.

EXAMPLE I

Briquet Preparation

A prior art composition was formulated with 5 wt.% of bituminous binder composition (asphalt) and 95% aggregate (20 to 35 mesh). A composition in accordance with the present invention was formulated with the same asphalt and the same aggregate, but the aggregate had been surface pretreated with pyridine and dried before using. The asphalt was a conventional petroleum asphalt. Asphalt-aggregate briquets were formed with each of the two compositions in an identical manner.

The manner of the formation of the briquets was as follows:

a dish containing 60 to 70 grams of the bituminous mixture was placed in a 150° C. oven and heated for exactly 20 minutes. The dish was removed from the oven and the contents were stirred. A portion of the contents were transferred into a cylindrical ambient temperature briquet mold. A ram was inserted into the cylinder and the assembled mold was placed in a press. The mixture was compacted at 2812 Kg for a total of 20 minutes. The briquets were carefully removed from the mold and then were cured at ambient temperature for three days. A more complete description of the manner of forming the briquets may be found in A Simple Laboratory Test to Indicate the Susceptibility of Asphalt-Aggregate Mixtures to Moisture Damage During Repeated Freeze-Thaw Cycles, H. Plancher, et al, proceedings of the 1980 Canadian Technical Asphalt Association meeting in Victoria, British Columbia, Nov. 24-26, 1980.

EXAMPLE II

Freeze-thaw Cycling

Each of the cured briquets prepared as in Example I were placed on a stress pedestal. The stress pedestal and and briquet were placed in a jar and sufficient distilled water was added to the jar to cover the briquet by about ½ inch. The jar was capped and placed in the refrigerator at $-10°$ to $-12°$ C. for 24 hours. After the 24 hours freeze cycle, the jar was removed from the refrigerator and placed in a sink containing warm tap water to aid in melting the ice. When all of the ice had melted (about 45 minutes), the jar was placed in a 60° C. oven for the remainder of a 24 hour period starting when the briquet was initially removed from the refrigerator. At the end of this period, the jar was removed from the oven, the lid was removed, and the briquet was carefully examined for the appearance of cracks. When no cracks were visible, the freeze-thaw cycles were repeated until such cracks were evident. This testing procedure is described in more detail in the previously mentioned H. Plancher, et al, paper.

When such a procedure was carried out with the two compositions of Example I, the control (without pyridine treatment) failed after seven freeze-thaw cycles. The composition in accordance with the present invention (pyridine pretreated) had not failed after twenty freeze-thaw cycles, whereupon the test was discontinued.

EXAMPLE III

Effect Of Addition Of Shale Oil Concentrate Containing Compounds With The Pyridine Type Moiety To Petroleum Asphalt-Aggregate Mixture Table I shows the effect of gradually replacing petroleum asphalt with shale oil concentrate vis-a-vis resistance to moisture induced damage. Four compositions were tested, the first of which had 5% petroleum asphalt and 0% shale oil concentrate containing compounds with the pyridine type moiety, the second 4.95% asphalt and 0.05% shale oil concentrate, the third 4.75% asphalt and 0.25% shale oil concentrate and the fourth 4.50% asphalt and 0.50% shale oil concentrate. Each of the four compositions had precisely 95% of a Wyoming quartzite aggregate. Each of the mixtures was formed into a briquet as described in the previous example and tested for stability as in the previous example. As will be evident from Table I the shale oil concentrate clearly improved the resistance to moisture induced damage of the overall asphalt-aggregate mixtures.

TABLE I

| Petroleum Asphalt wt. % | Shale Oil Concentrate wt. % | Quartzite wt. % | Freeze-Thaw Cycles to Failure |
|---|---|---|---|
| 5.00 | 0 | 95 | 1 |
| 4.95 | 0.05 | 95 | 2 |
| 4.75 | 0.25 | 95 | 5 |
| 4.50 | 0.5 | 95 | 6 |

The above set out examples, while not meant to be limiting, demonstrate the dramatic improvement in resistance to moisture induced damage attainable when operating in accordance with the present invention.

Field Corroboration of Invention

A shale oil derived asphalt-aggregate back road was discovered after the invention had been completed on government property in Anvil Points, Colorado at an oil shale retort facility. It was determined that the road had been laid to dispose of an otherwise useless shale oil residue and to reduce dust. The road was found to be in still serviceable twenty-seven years after it had been constructed.

A sample of the pavement was taken and examined for visual evidence of moisture induced damage of the binder, but no such evidence was found although the pavement core came from an area where a natural bog occurred and wherein natural freeze-thaw conditions were prevalent.

Industrial Applicability

The aforementioned improved bituminous binder composition is useful in the formation of roads and pavements, roofing materials and pond lining materials and anyplace where improved moisture resistance is needed in a bituminous binder.

Other aspects, objectives, and advantages of this invention can be obtained from a study of the disclosure and the appended claims.

What is claimed is:

1. An improved bituminous binder composition, comprising:
   a bituminous material; and
   a minor amount of a moisture damage inhibiting agent selected from compounds having the formula:

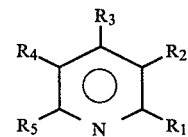

wherein $R_1$, $R_2$, $R_3$, $R_4$ and $R_5$ groups are hydrogen, organic radicals or organic radicals having chemical constituents substituted thereon and wherein any two or more of said $R_1$, $R_2$, $R_3$, $R_4$ and $R_5$ groups may be chemically bonded one to another, and acid salts of said compounds.

2. A composition as set forth in claim 1, wherein said agent comprises a high nitrogen content fraction obtained from shale oil.

3. A composition as set forth in claims 1 or 2, wherein said agent has a molecular weight below about 1000.

4. A method of providing a bituminous binder composition-aggregate mixture surfaced area that is resistant to moisture induced damage, comprising:

incorporating sufficient quantity of a moisture damage inhibiting agent selected from compounds having the formula:

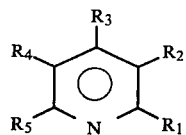

wherein $R_1$, $R_2$, $R_3$, $R_4$ and $R_5$ groups are hydrogen, organic radicals or organic radicals having chemical constituents substituted thereon and wherein any two or more of said $R_1$, $R_2$, $R_3$, $R_4$ and $R_5$ groups may be chemically bonded one to another, and acid salts of said compounds with said mixture to improve the moisture damage resistance thereof;

and applying said mixture to a surface to form said surfaced area.

5. A method as set forth in claim 4, wherein said incorporating comprises first applying said agent to said aggregate and thereafter mixing said aggregate with said bituminous binder composition.

6. A method as set forth in claim 4, wherein said incorporating comprises mixing said agent with said bituminous binder composition at least concurrently with mixing of said aggregate therewith.

7. A method as set forth in claim 4, including, prior to said incorporating step: isolating a fraction from shale oil, said fraction being rich in said agent; and wherein said incorporating step comprises mixing said fraction with said bituminous binder composition.

8. A method as set forth in claims 4, 5, 6 or 7, wherein said agent has a molecular weight below about 1000.

9. A method of enhancing the resistance to moisture damage of a bituminous binder composition aggregate mixture, comprising incorporating a sufficient quantity of a moisture damage reducing agent with said mixture to improve the moisture damage resistance thereof, said agent being selected from compounds having the formula:

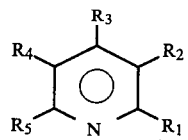

wherein $R_1$, $R_2$, $R_3$, $R_4$ and $R_5$ groups are hydrogen, organic radicals or organic radicals having chemical constituents substituted thereon and wherein any two or more of said $R_1$, $R_2$, $R_3$, $R_4$ and $R_5$ groups may be chemically bonded one to another, and acid salts of said compounds.

10. A method as set forth in claim 9, wherein said agent is incorporated in an amount from about 1 wt.% to about 15 wt.% of said bituminous binder composition.

11. A method as set forth in claims 9 or 10, wherein said agent has a molecular weight below about 1000.

12. A water damage resistance enhancing composition for an asphalt-aggregate composition comprising a mixture of pyridine moiety-containing compounds having molecular weights of about 1000 or less.

13. A composition according to claim 12 wherein said mixture of pyridine moiety-containing compounds have a molecular weight of about 700 or less.

14. A composition according to claim 12 wherein said mixture of pyridine moiety-containing compounds have a molecular weight of about 400 or less.

15. A composition according to claim 12, 13 or 14 wherein said composition is a fraction obtained from shale oil.

* * * * *